Sept. 13, 1927.

L. W. CHUBB

LIGHT TELEPHONY

Filed June 15, 1921

WITNESSES:

INVENTOR
Lewis Warrington Chubb
BY
ATTORNEY

Patented Sept. 13, 1927.

1,642,011

UNITED STATES PATENT OFFICE.

LEWIS WARRINGTON CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

LIGHT TELEPHONY.

Application filed June 15, 1921. Serial No. 477,629.

My invention relates to means for causing a change in the current flow in an electrical circuit by means of a beam of radiant energy, and it particularly relates to telephony and to means for causing voice vibrations to be produced in a sending circuit by controlling the amount of radiant energy striking a sensitive element associated with the sending circuit.

An object of my invention is to provide a system of light telephony in which the time lag of the impedance means that is sensitive to radiant energy shall be negligible, so that the distance over which messages may be transmitted may be radically increased over present practice.

Another object is to provide means for controlling the amount of radiant energy falling on the sensitive element in such manner that a feeble sound will produce a large change in the amount of energy transmitted.

Heretofore, telephony has been accomplished by employing a beam of visible or invisible radiation controlled by voice vibrations to affect the value of an impedance in a receiving circuit. These systems have employed selenium or other cells in which the lag of the resistance change is appreciable. In employing such cells in which the resistance lag is appreciable, the sensitivity is limited, so that about two miles is the greatest distance over which messages may be sent.

In my invention, I employ a photo-electric cell, as distinguished from selenium or other similar cells. There is little or no time lag to the photo-electric effect. I employ such a cell in combination with a thermionic amplifier, the cell being located in the input circuit of the amplifier, so that signals and speech may be sent much greater distances than has hitherto been possible.

In a modified form of my invention, I first polarize the light, rotate it electromagnetically and then pass it through an analyzer to control the amount of light striking the sensitive cell. The position of the analyzer may be so adjusted that only a portion of the light is permitted to pass through when no signals are being transmitted. A slight oscillation of the light-beam will vastly increase and decrease the amount of light passing through the analyzer. I control the oscillation of the light-beam in accordance with voice vibrations by means of a telephone circuit including a solenoid through which the polarized light-beam passes.

My systems may be operated either by visible or invisible rays. The radiant energy is in the form of waves of lengths approximating the wave lengths of the spectrum. That is to say, it comprises energy of wave lengths varying from ultra-violet through the visible spectrum and also those waves commonly called infra-red. In the specification and claims when I speak of light, it is to be distinctly understood that I may employ ultra-violet or infra-red wave lengths and that the operation of my invention does not depend upon the use of visible rays.

In order to make my invention more clearly understood, I have shown means for carrying the same into practical effect, with the understanding that the arrangement may be varied without avoiding the essence of the invention.

Figure 1:
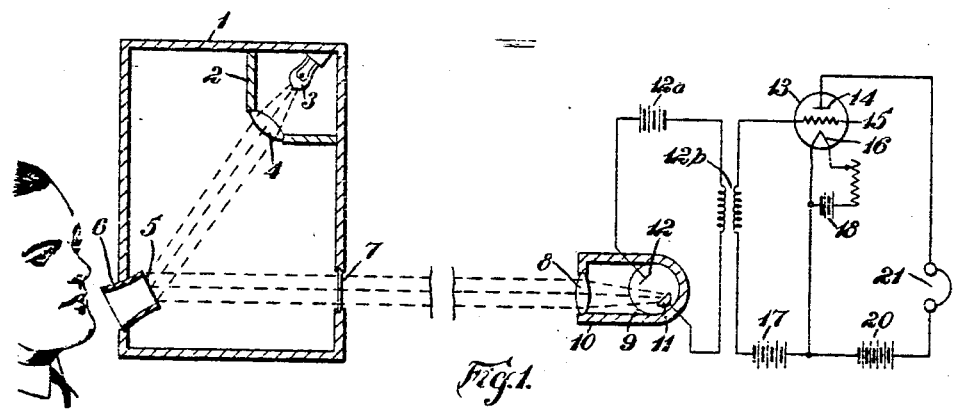
Figure 1 is a diagram illustrating one form of apparatus which I employ.

Referring to the drawings, Fig. 1 shows a system for transmitting speech waves comprising a dark chamber 1 within which is located, at any suitable place, as at the top of the chamber, a second dark chamber 2, containing a source of radiant energy, such as an incandescent electric light bulb 3. The rays of light pass through a convex lens 4 positioned in the walls of the dark chamber 2. The rays passing through the convex lens 4 are brought into parallel relation and are so directed as to fall upon a mirror surface 5 of thin flexible material adapted to vibrate in accordance with speech. The mirror surface 5 is fitted into a mouth-piece 6 located within the walls of the dark chamber 1 and is set at such an angle that the parallel rays from the source of light 3 are reflected through an aperture 7 in the dark chamber 1.

The transmitted beam is received by a convex lens 8 which concentrates the beam upon a photo-electric cell 9 located within the walls of a receiver dark chamber 10. The type of photo-electric cell 9 employed may be any one of several of the commercial types but it is essential that the type employed be operated by the photo-electric effect which has a time lag of practically zero. Known forms of selenium cells or similar cells depending upon variation of resistivity with light, and having an appreciable time lag are not adaptable to my system.

In the present instance, the photo-electric cell 9 comprises a cathode 11 of potassium at one side of an evacuated container having a plate anode 12 at the other end. The light rays impinge on the cathode 11 and cause it to emit electrons, thus permitting a greater flow of current through the cell.

The photo-electric cell 9 is located within a circuit comprising a battery 12a and the primary winding of a transformer 12b. The secondary winding of the transformer 12b is located within the input circuit of a thermionic amplifier 13 having a plate element 14, a grid element 15 and a filament element 16. A negative potential is applied to the grid 15 by means of a "C" battery 17. A filament battery 18 heats the filament 16 to the proper degree for efficient operation of the amplifier 13. In the plate circuit of the thermionic amplifier 13 is located a plate battery 20 and means for detecting voice or other modulations produced in the plate circuit. In the particular form illustrated in Fig. 1, I have shown a telephone receiver 21.

In operation, radiant energy from the source 3 is thrown in a parallel beam against the flexible reflecting surface 5; thence it is reflected through the convex lens 8 and focused upon the photo-electric cell 9. When speech-waves enter the mouth piece 6, the reflecting surface 5 is vibrated to diffuse the light reflected through the convex lens 8. The light focused by the lens 8 upon the photo-electric cell 9 is thus caused to vary in intensity in accordance with voice vibrations.

The electron emission from the cathode of the photo-electric cell 9 is dependent upon the amount of radiant energy received and is substantially instantaneously responsive to any change in the quantity of received radiant energy. The change in the electron emission of the photo-electric cell 9 varies the current through the cell and the primary of the transformer 12b and thus varies the potential applied to the grid 15 of the thermionic amplifier 13, and this, in turn, produces a change in the amount of output or plate current, in accordance with the well known operation of thermionic amplifiers. The changes in the output current are detected by the telephone receiver 21 and thus speech in the mouth piece 6 may be transmitted over a considerable distance.

Figure 2:
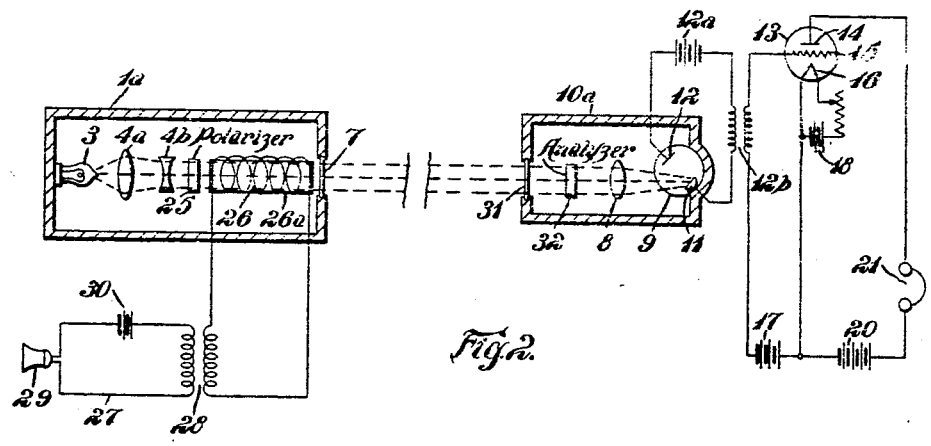
Fig. 2 is a diagram illustrating a modification in which polarized light is employed.

In Fig. 2, I have shown a system somewhat similar to that shown in Fig. 1 but with a different arrangement for varying the amount of radiant energy that strikes the photo-electric cell 9. In this form of apparatus, though I preferably employ a cell having a zero time lag, the means for controlling the amount of radiant energy striking the cell 9 is so efficient that good results may be obtained by the employment of light-sensitive cells other than those operated by the photo-electric effect.

In Fig. 2 is shown a dark chamber 1a in which is located a source of light 3 and a system of lenses, such as a convex lens 4a and a concave lens 4b, for producing a parallel beam of light. The beam of light passes through a polarizer 25 which may be a tourmaline crystal, a Nicol prism or any equivalent substance, and the beam then passes through a magnetizing solenoid 26 and leaves the dark chamber through an aperture 7. Within the solenoid 26 is preferably a substance 26a having a greater magneto-optic rotation effect in a given field, than air. Suitable substances for this purpose are flint glass and liquid carbon disulphide.

The solenoid 26 is coupled to a telephone circuit 27 through a transformer 28, said telephone circuit including a telephone transmitter 29 and a battery 30. The polarized light, in passing through the magnetic field of the solenoid 26, has its plane of polarization rotated in accordance with the intensity and direction of said magnetic field, and hence is rotated in accordance with the voice vibrations in the transmitter 29. While I have shown the solenoid 26 as being magnetically coupled to a modulating circuit 27, it is to be understood that the solenoid could be directly included in the modulating circuit and that a telegraph key or other signal-controlling means could be substituted for the telephone transmitter 29.

The transmitted beam is received through an aperture 31 in a dark chamber 10a and passes through an analyzer 32 which may be composed of the same substance as the polarizer 25. The light then passes through a convex lens 8 and is focused upon the sensitive cathode of a photo-electric cell 9, as in the modification shown in Fig. 1. The receiving circuits are the same as in Fig. 1.

In operation, the light from the source 3 is transmitted as a polarized beam, the plane of polarization varying in accordance with the voice vibrations, as above explained, and the analyzer 32 is so arranged that the light reaching the sensitive cathode 11 is cut off entirely or is reduced in accordance with the variations in the plane of the transmitted beam. By this means, a signal beam may be employed which is constant in intensity and which cannot be detected without the employment of an analyzer or its equivalent.

While I have shown my invention in two preferred forms, it will be obvious to those skilled in the art that it is susceptible of various minor changes and modifications without departing from the spirit thereof, and I desire, therefore, that only such limitations shall be placed thereupon as are imposed by the prior art or are specifically set forth in the appended claims.

I claim as my invention:

1. The method of light-telephony which consists in producing a polarized beam of light, causing said beam to be variably rotated in accordance with sound frequency signals to be transmitted and causing said variably rotated beam to produce varying photo-electric effects in a receiving circuit.

2. The method of light-telephony which consists in producing a beam of light, causing said beam to be polarized in varying planes which are varied in accordance with sound frequency signals to be transmitted, causing said beam to traverse means adapted to transmit light polarized in a single plane and causing the resultant beam to produce varying photo-electric effects in a receiving circuit.

3. The method of light-telephony which consists in producing a polarized beam of light, causing said beam to be modulated in accordance with sound frequency signals to be transmitted and causing said modulated beam to produce corresponding modulations of current in a receiving circuit.

4. The method of light-telephony which consists in producing a polarized beam of light, causing said beam to be variably rotated in accordance with sound frequency signals to be transmitted and causing said variably rotated beam to produce corresponding modulations of current in a receiving circuit.

5. The method of light-telephony which consists in producing a beam of light, causing said beam to be polarized in varying planes which are varied in accordance with sound frequency signals to be transmitted, causing said beam to traverse means adapted to transmit light polarized in a single plane and causing the resultant beam to produce corresponding modulations of current in a receiving circuit.

6. A system of light-telephony comprising means for projecting a beam of light, means for causing said beam to be polarized in varying planes which are varied in accordance with sound frequency signals to be transmitted, means adapted to transmit light polarized in a single plane, said last mentioned means being arranged in the path of said beam, a photo-electric cell comprising an evacuated container having a light-responsive electron-emitting cathode and an anode, said cathode being subjected to the action of said beam and detector means associated with said cell.

7. A system of light-telephony comprising means for projecting a beam of light, means for causing said beam to be polarized in varying planes which are varied in accordance with sound frequency signals to be transmitted, means adapted to transmit light polarized in a single plane, said last mentioned means being arranged in the path of said beam and a photo-electric translating device responsive to modulations in the intensity of said beam.

In testimony whereof, I have hereunto subscribed my name this 8th day of June, 1921.

LEWIS WARRINGTON CHUBB.